United States Patent [19]
Aydin et al.

[11] Patent Number: 5,498,655
[45] Date of Patent: Mar. 12, 1996

[54] AQUEOUS POLYMER DISPERSION

[75] Inventors: Oral Aydin, Mannheim; Michael Portugall, Wachenheim; Josef Neutzner, Neustadt; Walter Maechtle, Ludwigshafen, all of Germany

[73] Assignee: BASF Aktiengesellschaft, Ludwigshafen, Germany

[21] Appl. No.: 373,070

[22] Filed: Jan. 17, 1995

Related U.S. Application Data

[62] Division of Ser. No. 149,796, Dec. 22, 1993, Pat. No. 5,426,146, which is a division of Ser. No. 51,555, Apr. 23, 1993, abandoned.

[30] Foreign Application Priority Data

Apr. 29, 1992 [DE] Germany ............ 42 13 969.4

[51] Int. Cl.⁶ ..................................................... C08L 3/08
[52] U.S. Cl. ............................................ 524/458; 524/460
[58] Field of Search ........................... 524/458, 460, 524/161, 159, 160

[56] References Cited

U.S. PATENT DOCUMENTS

| | | | |
|---|---|---|---|
| 4,017,442 | 4/1977 | Gibbs et al. | 524/460 |
| 4,539,361 | 9/1985 | Siol et al. | 524/460 |
| 5,340,858 | 8/1994 | Bauer et al. | 524/458 |
| 5,340,859 | 8/1994 | Aydin et al. | 524/458 |

FOREIGN PATENT DOCUMENTS 359562  3/1990  European Pat. Off. ..

*Primary Examiner*—Jeffrey T. Smith
*Attorney, Agent, or Firm*—Oblon, Spivak, McClelland, Maier, & Neustadt

[57] ABSTRACT

An aqueous polymer dispersion having a solids volume concentration of 50% by volume or more is obtainable by polymerizing radical polymerizable monomers other than vinyl or vinylidene halides by the method of free radical aqueous emulsion polymerization with the addition of an aqueous starting polymer dispersion having a certain diameter distribution of the starting polymer particles present therein by the stream addition process.

28 Claims, No Drawings

AQUEOUS POLYMER DISPERSION

This is a Division of application Ser. No. 08/149,796 filed on Dec. 22, 1993, now U.S. Pat. No. 5,426,146; which is a Divisional of application Ser. No. 08/051,555 filed on Apr. 23, 1993, abandoned.

The present invention relates to a final aqueous polymer dispersion which has a solids volume concentration (solids volume=solids mass divided by solids density) of at least 50% by volume and is obtainable by polymerizing at least one radical polymerizable monomer other than a vinyl or vinylidene halide with the addition of at least one aqueous starting polymer dispersion I in a polymerization vessel by the method of free radical aqueous emulsion polymerization in the presence of dispersants and free radical polymerization initiators with the proviso that A) the mass of polymer contained in the at least one aqueous starting polymer dispersion I added relative to the total mass comprising the mass of the at least one radical polymerizable monomer and the mass of polymer added in the form of the aqueous starting polymer dispersion I is from 1 to 10%, preferably from 1 to 5%, B) the at least one aqueous starting polymer dispersion I added is constituted like an aqueous polymer dispersion obtained by adding together n aqueous starting polymer dispersions II with the proviso that a) n is an integer$\geq 2$, b) the weight average particle diameter of the starting polymer particles present in dispersion in the respective aqueous starting polymer dispersions II is for every aqueous starting polymer dispersion II within the range >0 to 400 nm, c) the weight average particle diameter of the starting polymer particles of at least one aqueous starting polymer dispersion II is within the range >0 to 100 nm, d) the aqueous starting polymer dispersions II have a monomodal distribution of the diameters of the starting polymer particles they contain such that, if $d_x$ defines the diameter below which is the particle diameter of X % by weight of all the starting polymer particles present in the particular aqueous starting dispersion II, the ratio $(d_{90}-d_{10})/d_{50}$ is from 0.1 to 0.6, e) the relation between the volume $V_i$, obtainable by dividing the mass of the i-th starting polymer II present in the i-th aqueous starting polymer dispersion II by the mass density of the i-th starting polymer II, and the similarly determined volume $V_j$, providing that not only the weight average particle diameter ($\bar{d}_{w,i}$) of the starting polymer particles present in the i-th aqueous starting polymer dispersion II but also $\bar{d}_{w,j}$ is above 100 nm, satisfies equation 1

$$V_i = V_j \cdot k \cdot \left( \frac{\bar{d}_{w,i}}{\bar{d}_{w,j}} \right)^2 \quad (1)$$

where k is from 1/1.5 to 1.5, f) the relation between the weight average particle diameter ($\bar{d}_{w,\leq 100}$) of the starting polymer particles determined over the total amount of all the aqueous starting polymer dispersions II that have a weight average particle diameter of the starting polymer particles they contain within the range >0 to $\leq 100$ nm, and the weight average particle diameter ($\bar{d}_{w,i}$) of the starting polymer particles present in the i-th aqueous starting polymer dispersion II, providing that $\bar{d}_{w,i}$ is > 100 nm, satisfies equation 2

$$V_i = V_{\leq 100} \cdot k' \left( \frac{\bar{d}_{w,i}}{\bar{d}_{w,\leq 100}} \right)^2 \quad (2)$$

where k' is from 0.5 to 5, $V_i$ is the mass of the starting polymer present in the i-th aqueous starting polymer dispersion II divided by the mass density of the starting polymer, $V_{\leq 100}$ is the mass of the starting polymer present in the total amount of all aqueous starting polymer dispersions II that have a weight average particle diameter of the starting polymer particles they contain within the range >0 to $\leq 100$ nm, divided by the mass density of the starting polymer, g) $V_{\leq 100}$ is from 0.3 to 10% by volume, based on the sum of all $V_i$, and h) the difference between the smallest and the largest weight average particle diameter $\bar{d}_{w,i}$ of the aqueous starting polymer dispersions II present in the aqueous starting polymer dispersion I is at least 150 nm, c) the total amount of the at least one aqueous starting polymer dispersion I to be added is introduced into the polymerization vessel as initial charge prior to the start of the free radical aqueous emulsion polymerization, and D) the free radical aqueous emulsion polymerization of the at least one radical polymerizable monomer is effected by the stream addition method with the proviso that from the start of the free radical aqueous emulsion polymerization the addition of the at least one radical polymerizable monomer to the polymerization vessel is effected in such a way that at any time of the addition the polymerization conversion of the total monomers already added previously to the polymerization vessel is at least 80 mol %, and the amount of dispersant present in the polymerization vessel is at any time from the start of the free radical aqueous emulsion polymerization from 0.5 to 5% by weight, based on the sum of the masses of starting polymer I and the monomers to be polymerized already added to the polymerization vessel.

The present invention further relates to the process for preparing such final aqueous polymer dispersions and to the use thereof as binders and as materials for preparing coatings and adhesive joints.

Aqueous polymer dispersions are systems comprising polymer particles dispersed as disperse phase in an aqueous dispersion medium.

Polymer solutions form polymer films as the solvent evaporates. Aqueous polymer dispersions behave the same way on evaporation of the aqueous dispersion medium, which is why aqueous polymer dispersions find varied use as binders, for example for paints or for leather coatings.

Aqueous polymer dispersions having a high polymer content are of particular advantage in that, on the one hand, their relatively lower proportion of aqueous dispersion medium reduces the energy required for evaporating it, for example for film formation or for preparing polymer powders, and, on the other, the useful polymer can be stored and transported using a relatively smaller amount of aqueous phase as carrier medium.

However, there is a disadvantage in that, as the volume concentration of the polymer increases (U.S. Pat. No. 4,130, 523), there are problems with the preparation of aqueous polymer dispersions. For instance, the flow resistance (viscosity) increases and this increased viscosity makes it difficult not only to remove the heat of reaction but also to process the aqueous dispersion; secondly, there is an increasing tendency for the dispersed polymer particles to aggregate for reasons of thermodynamic stability. The resulting flocs [a) microflocs or specks; not normally removable by conventional filtration; b) macroflocs or coagulum; normally removable by conventional filtration] interfere in particular with the film forming of the aqueous polymer dispersions and are therefore generally undesirable.

According to studies about the flow resistance of aqueous polymer dispersions, those having a broad size distribution (polydispersity) of the dispersed polymer particles for the same solids content generally have a lower flow resistance than those with a narrow size distribution (which are in the extreme case monodispersed). Furthermore, coarse aqueous polymer dispersions have a lower flow resistance than fine aqueous polymer dispersions, given the same solids content.

EP-A-129 699 discloses a process for preparing an aqueous polymer dispersion wherein unsaturated monomers are polymerized in a conventional manner in a polymerization vessel by the method of free radical aqueous emulsion polymerization with the addition of an aqueous dispersion of a starting polymer such that the addition of the aqueous dispersion of the starting polymer must be concluded before 40% by weight of the total monomers to be polymerized have copolymerized and must not start before the average particle size of the emulsion polymer formed in the course of the polymerization of the monomers is twice that of the aqueous dispersion of the starting polymer. In fact, the aqueous dispersion of the starting polymer is preferably not added over a prolonged period but all at once.

The disadvantages of the aqueous polymer dispersions thus obtainable are that their flow resistance is not fully satisfactory above a solids volume concentration of 50% by volume and that, according to the embodiment examples, the solids volume concentration is limited to values below 65% by volume.

U.S. Pat. No. 4,130,523 concerns a process for preparing aqueous polymer dispersions wherein aqueous polymer dispersion already formed in the course of the polymerization process is continuously removed from the reaction zone, stored and later reintroduced into the reaction zone as a kind of starting polymer dispersion. A disadvantage of this process is that it is unsuitable for industrial implementation.

U.S. Pat. No. 3,424,706 concerns a process for preparing aqueous dispersions of polymers containing at least 70–97% by weight of vinylidene chloride as copolymerized units, wherein the polymerization of the monomers is effected with the addition of an aqueous dispersion of a starting polymer. The said reference teaches inter alia mixing the monomers to be polymerized and the aqueous dispersion of the starting polymer with one another and adding this mixture to the initial charge comprising part of the polymerization batch.

The disadvantage with this process is that it is restricted to monomer mixtures consisting chiefly of vinylidene chloride. Moreover, according to the illustrative embodiments, the aqueous polymer dispersions obtainable by this process are unsatisfactory not only as regards the flow resistance above a solids volume concentration of 50% by volume but also as regards the upper limit for the solids volume concentration attainable in a still satisfactorily flowable state.

It is an object of the present invention to make available aqueous polymer dispersions that are obtainable in a simple, industrially suitable, reproducible manner not restricted to specific monomers with an increased solids volume concentration but a reduced flow resistance and reduced floc content.

We have found that this object is achieved by the final aqueous polymer dispersions defined at the beginning.

Remarkably, the subject-matter of the invention is not restricted to the free radical aqueous emulsion polymerization of monomer mixtures composed chiefly or exclusively of vinyl and/or vinylidene halides, despite the generally known fact that the development of the disperse phase in the case of monomers other than vinyl and/or vinylidene halides is a significantly more complex phenomenon.

Suitable radical polymerizable monomers for the process of the invention are therefore in particular, inter alia, monoethylenically unsaturated monomers such as olefins, for example ethylene, aromatic vinyl monomers such as styrene, $\alpha$-methylstyrene, o-chlorostyrene or vinyltoluenes, esters of vinyl alcohol and monocarboxylic acids having from 1 to 18 carbon atoms, such as vinyl acetate, vinyl propionate, vinyl-n-butyrate, vinyl laurate and vinyl stearate, esters of $\alpha,\beta$-monoethylenically unsaturated mono- and dicarboxylic acids preferably of from 3 to 6 carbon atoms, such as, in particular, acrylic acid, methacrylic acid, maleic acid, fumaric acid and itaconic acid, with alkanols in general of from 1 to 12, preferably of from 1 to 8, in particular of from 1 to 4, carbon atoms, such as, in particular, methyl, ethyl, n-butyl, isobutyl and 2-ethylhexyl acrylate and methacrylate, dimethyl maleate or n-butyl maleate, nitriles of $\alpha,\beta$-monoethylenically unsaturated carboxylic acids such as acrylonitrile and also $C_{4-8}$-conjugated dienes such as 1,3-butadiene and isoprene. The monomers mentioned generally form the principal monomers which, based on the total amount of the monomers to be polymerized by the method of free radical aqueous emulsion polymerization, normally account for a proportion of more than 50% by weight. Monomers which polymerized by themselves normally form homopolymers that possess enhanced water solubility are normally included in the polymer only as modifying monomers, in amounts, based on the total amount of monomers to be polymerized, of less than 50% by weight, in general from 0.5 to 20, preferably from 1 to 10, % by weight.

Examples of monomers of this type are $\alpha,\beta$-monoethylenically unsaturated mono- and dicarboxylic acids of from 3 to 6 carbon atoms and amides thereof, eg. acrylic acid, methacrylic acid, maleic acid, fumaric acid, itaconic acid, acrylamide and methacrylamide, also vinylsulfonic acid and water-soluble salts thereof, and also N-vinylpyrrolidone. Monomers which customarily enhance the internal strength of the films formed from the final aqueous polymer dispersion are in general likewise included in the polymer only in minor amounts, usually from 0.5 to 10% by weight, based on the total amount of monomers to be polymerized. Monomers of this type normally have an epoxy, hydroxyl, N-methylol, carbonyl or at least two nonconjugated ethylenically unsaturated double bonds. Examples thereof are N-alkylolamides of $\alpha,\beta$-monoethylenically unsaturated carboxylic acids of from 3 to 10 carbon atoms and esters thereof with alcohols of from 1 to 4 carbon atoms, of which N-methylolacrylamide and N-methylolmethacrylamide are very particularly preferred, divinyl monomers, divinylidene monomers and also dialkenyl monomers. Particularly suitable instances of these are the diesters of dihydric alcohols with $\alpha,\beta$-monoethylenically unsaturated monocarboxylic acids, of which in turn acrylic and methacrylic acid are preferred. Examples of such monomers having two nonconjugated ethylenically unsaturated double bonds are alkylene glycol diacrylates and dimethacrylates such as ethylene glycol diacrylate, 1,3-butylene glycol diacrylate, 1,4-butylene glycol diacrylate, propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate. In this connection of particular importance are also $C_1$–$C_8$-hydroxyalkyl methacrylates and acrylates, such as n-hydroxyethyl, n-hydroxypropyl or n-hydroxybutyl acrylate and methacrylate, and also compounds such as diacetoneacrylamide and acetylacetoxyethyl acrylate or methacrylate. As well as monomers having unsaturated double bonds it is possible for minor amounts, customarily from 0.01 to 2% by weight, based on the monomers to be polymerized, of molecular weight regulators, such as tert-dodecyl mercaptan and 3-mercaptopropyltrimethoxysilane to be included in the polymer. It is preferable to add such substances to the polymerization zone mixed with the monomers to be polymerized.

Suitable dispersants include not only the protective colloids customarily used for carrying out free radical aqueous emulsion polymerizations but also emulsifiers. Examples of suitable protective colloids are polyvinyl alcohols, cellulose derivatives and vinyl-pyrrolidone-containing copolymers. A detailed description of further suitable protective colloids may be found in Houben-Weyl, Methoden der organischen Chemie, Volume XIV/1, Makromolekulare Stoffe, Georg Thieme Verlag, Stuttgart, 1961, pages 411 to 420. It is of course also possible to use mixtures of emulsifiers and/or protective colloids. Preferably, the dispersants used are exclusively emulsifiers whose relative molecular weights are customarily below 1000, in contradistinction to the protective colloids. They can be anionic, cationic or non-ionic in nature. Of course, if mixtures of surface active substances are used, the individual components must be compatible with one another, which can be verified beforehand by means of a few preliminary experiments if there is any doubt. In general, anionic emulsifiers are compatible with one another and with nonionic emulsifiers. The same is true of cationic emulsifiers, while anionic and cationic emulsifiers are usually incompatible with one another. Examples of customary emulsifiers are ethoxylated mono-, di- and trialkylphenols (EO degree: 3–50, alkyl radical: $C_4$–$C_9$), ethoxylated fatty alcohols (EO degree: 3–50, alkyl radical: $C_8$–$C_{36}$), and also alkali metal and ammonium salts of alkyl sulfates (alkyl radical: $C_8$–$C_{12}$), of sulfuric monoesters of ethoxylated alkanols (EO degree: 4–30, alkyl radical: $C_{12}$–$C_{18}$), and ethoxylated alkylphenols (EO degree: 3–50, alkyl radical: $C_4$–$C_9$), of alkylsulfonic acids (alkyl radical: $C_{12}$–$C_{18}$) and of alkylarylsulfonic acids (alkyl radical: $C_9$–$C_{18}$). Further suitable emulsifiers may be found in Houben-Weyl, Methoden der organischen Chemie, Volume XIV/1, Makromolekulare Stoffe, Georg Thieme Verlag, Stuttgart, 1961, pages 192 to 208.

Particularly suitable surface active substances are compounds of the general formula I

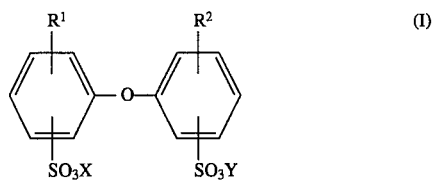

where $R^1$ and $R^2$ are each hydrogen or $C_4$–$C_{24}$-alkyl but are not both hydrogen, and X and Y are each an alkali metal or ammonium ion. In the formula I, $R^1$ and $R^2$ are each preferably linear or branched alkyl radicals of from 6 to 18 carbon atoms or hydrogen, in particular of 6, 12 and 16 carbon atoms, but $R^1$ and $R^2$ must not both be hydrogen. X and Y are each preferably sodium, potassium or ammonium ions, of which sodium is particularly preferred. Of particular advantage are compounds I in which X and Y are each sodium, $R^1$ is a branched alkyl radical of 12 carbon atoms and $R^2$ is hydrogen or $R^1$. It is common to employ technical grade mixtures containing from 50 to 90% by weight of the monoalkylated product, for example Dowfax® 2A1 (trademark of the Dow Chemical Company). In the process of the invention compounds I are preferably used as the sole dispersants and particularly preferably in mixture with ethoxylated fatty alcohols (EO degree: 3–50, alkyl radical: $C_8$–$C_{36}$). Compounds I are generally known, for example from U.S. Pat. No. 4,269,749, and are commercially available. It is advantageous for the final aqueous polymer dispersion of the invention to contain from 1 to 3% by weight of surface active substances, based on the mass of the final polymer.

Suitable free radical polymerization initiators are all those which are capable of initiating a free radical aqueous emulsion polymerization. This includes not only peroxides, for example alkali metal peroxodisulfates, but also azo compounds. Preference is given to using combined systems composed of at least one organic reducing agent and at least one peroxide and/or hydroperoxide, eg. tert-butyl hydroperoxide and the sodium salt of hydroxymethanesulfinic acid or hydrogen peroxide and ascorbic acid, and very particular preference is given to combined systems which in addition contain a small amount of a metal compound that is soluble in the polymerization medium and whose metallic component can exist in a plurality of valence states, for example ascorbic acid/iron(II) sulfate/hydrogen peroxide, although instead of ascorbic acid it is also cowon to employ the sodium salt of hydroxymethanesulfinic acid, sodium sulfite, sodium bisulfite or sodium metabisulfite and instead of hydrogen peroxide it is common to employ tert-butyl hydroperoxide or alkali metal peroxodisulfates and/or ammonium peroxodisulfate. Instead of a water-soluble iron(II) salt it is common to employ a combination of water-soluble Fe/V salts. The amount of free radical initiator system used is preferably from 0.1 to 2% by weight, based on the total amount of monomers to be polymerized.

The manner of addition of the free radical initiator system to the polymerization vessel in the course of the free radical aqueous emulsion polymerization of the invention is rather of minor importance for the success of the process of the invention. The initiator system can not only be introduced into the polymerization vessel in its entirety as part of the initial charge but also be added continuously or stepwise in the course of the free radical aqueous emulsion polymerization at the rate of its consumption. The choice in a particular case depends in the usual fashion not only on the chemical nature of the initiator system but also on the polymerization temperature.

The polymerization pressure and the polymerization temperature are likewise of rather minor importance. In general, the temperature employed will be between room temperature and 100° C., preferably within the range from 50° to 95° C. The employment of superatmospheric or reduced pressure is possible, so that the polymerization temperature may also exceed 100° C. and may in fact be as high as 130° C. Volatile monomers such as ethylene, butadiene or vinyl chloride are preferably polymerized under superatmospheric pressure. To control the pH of the polymerization medium ammonia, for example, may be added during the free radical aqueous emulsion polymerization of the invention.

The radical polymerizable monomers mentioned by way of example as suitable for the free radical aqueous emulsion polymerization of the invention are suitable not only for use as constituents of the monomer mixture to be polymerized according to the invention, but also, in the same way as thepolymerization initiators, molecular weight regulators and pH regulators recomended for the free radical aqueous emulsion polymerization of the invention, for use as constituents of the starting polymers I, II and of the starting polymer dispersions containing these, although the monomer, regulator and initiator composition for the preparation of the aqueous starting polymer dispersions I, II can be not only congruent with but also different from that for the process of the invention. This applies mutatis mutandis necessarily also to the surface active substances to be used for preparing the aqueous starting polymer dispersions I, II.

Aqueous starting polymer dispersions I are obtainable in a simple manner by adding together in the manner defined n aqueous starting polymer dispersions II whose particle diameter distribution functions preferably essentially do not overlap. From an application point of view n is preferably within the range from 2 to 10, preferably within the range from 2 to 5. The preparation of aqueous starting polymer dispersions II is known per se. Appropriate teaching may be found for example in Houben-Weyl, Methoden der organischen Chemie, Volume E 20, part I, Makromolekulare Stoffe, Georg Thieme Verlag, Stuttgart, 1987, pages 248 to 268. If the solids content used is to be a preferred 20–40% by weight and the desired weight average particle diameter is within the range $> 0$ to $\leq 50$ nm, the aqueous starting polymer dispersions II are obtainable in a particularly simple manner, for example by mixing together the aqueous phase, the monomers, the free radical initiators (normally from 0.1 to 5% by weight, based on the amount of starting monomers to be polymerized), and dispersants (customarily from 10 to 50% by weight, based on the amount of starting monomers to be polymerized) at a low temperature and heating the mixture to the polymerization temperature and polymerizing it (the particle diameter generally decreases with increasing amount of dispersant). In another version, the initial charge comprises essentially all the components, but the polymerization initiator is added continuously after the charge has been heated to the reaction temperature and while it is maintained at that temperature. As regards polymerization temperature and pressure, the statements concerning the process the invention apply.

Starting with thus obtainable relatively finely divided aqueous starting polymer dispersions II, coarsely divided aqueous starting polymer dispersions II are obtainable for example by introducing a finely divided aqueous starting polymer dispersion II into a polymerization vessel as initial charge, heating to the polymerization temperature and then adding further monomers, customarily preemulsified in aqueous medium, and polymerization initiator while the polymerization temperature is maintained. The amount of emulsifier added as part of the aqueous monomer emulsion is determined in such a way that the total amount of dispersant present in the resulting more coarsely divided aqueous starting polymer dispersion II is from 0.5 to 5, preferably from 0.5 to 3, % by weight, based on the resulting coarsely divided starting polymer II. The particle enlargement to be obtained is essentially determined by the ratio of initially charged finely divided starting polymer II particles and added monomers. Of course, there can be a smooth transition from the process of preparing a relatively finely divided aqueous starting polymer dispersion II to the process of particle size enlargement. The statements about weight average polymer particle diameters and ratios $(d_{90}-d_{10})/d_{50}$ of the aqueous starting polymer dispersions here always relate to determinations by means of an analytical ultracentrifuge (W. Mächtle, Makromolekulare Chemie 185 (1984), 1025–1039). The determinations of the polymer particle size distribution of the final aqueous polymer dispersions were carried out in an analytical ultracentrifuge using the coupling PSD technique (cf. W. Mächtle, Angewandte Makromolekulare Chemie 162 (1988), 35–42 (no. 2735)).

For the purposes of the present invention it is preferable to use those aqueous starting polymer dispersions I which, of aqueous starting polymer dispersions II where $\bar{d}_{w,i} \leq 100$ nm, contain only those whose $\bar{d}_{w,i}$ is exclusively within the range $\geq 20$ nm to $\leq 100$ nm, particularly preferably exclusively within the range $\geq 30$ to $\leq 60$ nm. It is also advantageous to use those aqueous starting polymer dispersions I which contain only such aqueous starting polymer dispersions II that the difference between $\bar{d}_{w, \leq 100}$ and $\bar{d}_{w,i}$, where $\bar{d}_{w,i}$ here is the weight average particle diameter of that aqueous starting polymer dispersion II contained in the aqueous starting polymer dispersion I whose above 100 nm value is closest to 100 nm, is at least 60, preferably at least 100, nm.

Furthermore, preference is given to using those aqueous starting polymer dispersions I for which all the k values are within the range from 0.9 to 1.1 and all the k' values within the range from 0.75 to 3, preferably within the range from 0.9 to 1.5. It is particularly advantageous for all the values k and k' of the at least one aqueous starting polymer dispersion I used to be about 1.

Furthermore, $V_{\leq 100}$ of the at least one aqueous starting polymer dispersion I to be added is advantageously from 0.5 to 5% by volume, based on the sum of all the $V_i$ it contains. The dispersant content of the at least one aqueous starting polymer dispersion I is normally from 0.5 to 5% by weight, based on the amount of starting polymer I present therein.

As defined, the final aqueous polymer dispersions of the invention are obtainable when the total amount of the at least one aqueous starting polymer dispersion I to be added is introduced into the polymerization vessel as initial charge prior to the start of the free radical aqueous emulsion polymerization of the invention, and the free radical aqueous emulsion polymerization of the at least one monomer to be subjected to a free radical polymerization is effected by the stream addition process.

If final polymer dispersions having a particularly high solids volume concentration are desired, it is advantageous to add the monomers to the polymerization vessel by themselves. Otherwise the monomers to be subjected to a free radical polymerization are preferably added preemulsified in an aqueous phase, in which case the amount of emulsifier used for this purpose is advantageously from 0.5 to 3% by weight, based on the amount of emulsified monomer.

It is technically advantageous for the initial charge introduced into the polymerization vessel to comprise not only the at least one aqueous starting polymer dispersion I to be added but also some polymerization initiator and a small proportion of the at least one monomer to be polymerized (typically from 1 to 5% by weight based on the total amount of the at least one monomer to be polymerized), the mixture to be heated to the polymerization temperature and then, while the poly-merization is maintained, for the remaining monomer and further polymerization initiator to be added synchronously to the polymerization vessel in such a way that from the start of the free radical aqueous emulsion polymerization the addition of the at least one radical polymerizable monomer into the polymerization vessel is effected in such a way that at any time of the addition the polymerization conversion of the total monomers already added previously to the polymerization vessel is at least 80, preferably at least 90, mol %, in which case the initiator addition period preferably extends somewhat beyond the duration of the monomer addition period. However, the free radical aqueous emulsion polymerization of the invention can also be carried out by including in the initial charge only the aqueous starting polymer dispersion I, heating to the polymerization temperature and then initiating the polymerization by starting the addition of polymerization initiator and the addition of monomer at the same time. Of course, in the course of the addition stream process the polymerization vessel can be supplied with additional dispersant, for example as a spatially separate stream or as part of the monomer emulsion.

If this is the case, then the procedure according to the invention is such that the amount of dispersant present in the polymerization vessel is at any time from the start of the free radical aqueous emulsion polymerization of the invention from 0.5 to 5% by weight, based on the sum of the masses of starting polymer I and the monomers to be polymerized already added to the polymerization vessel.

Of course, in the course of the aqueous free radical emulsion polymerization of the invention it is possible for the composition of the monomers to be added to be changed during the stream addition process. Furthermore, the addition can take place not only stepwise but also continuously or by the gradient method. Preferably, the monomer addition takes place continuously.

On completion of the actual polymerization process of the invention the mixture is preferably stirred for some additional hours while the polymerization temperature is maintained. This may be followed by customary measures for residual monomer removal, for setting a different pH or other methods of post-stabilization, including the subsequent addition of dispersants. Of course, the various possible, generally spatially separate, feed streams can be mixed with one another immediately before entry into the polymerization vessel.

Preferred classes of final polymers are those composed to an extent of from 70 to 100% by weight of esters of acrylic and/or methacrylic acid with alkanols of from 1 to 12 carbon atoms and/or styrene or to an extent of from 70 to 100% by weight of styrene and/or butadiene of which the class of the acrylates is particularly preferred and preferably comprises the following monomer compositions:

70–99% by weight of at least one ester of acrylic and/or methacrylic acid with alkanols of from 1 to 8 carbon atoms, 1–5% by weight of acrylic acid, methacrylic acid or a mixture thereof, and 0–25% by weight of vinyl acetate, styrene or a mixture thereof.

The free radical aqueous emulsion polymerization of the invention makes it possible to produce in a simple manner final aqueous polymer dispersions which have a very wide final polymer particle size distribution which typically forms part of the following two particle size distribution specifications:

2–25% by weight of final polymer≦200 nm
10–50% by weight of final polymer≦300 nm
30–75% by weight of final polymer≦400 nm
45–85% by weight of final polymer≦500 nm
100% by weight of final polymer≦700 nm or 2–5% by weight of final polymer≦200 nm
8–15% by weight of final polymer≦300 nm
18–45% by weight of final polymer≦400 nm
20–50% by weight of final polymer≦500 nm
22–65% by weight of final polymer≦600 nm
50–85% by weight of final polymer≦700 nm
55–98% by weight of final polymer≦800 nm
100% by weight of final polymer≦1200 nm It is presumably this specific particle size distribution which is responsible for the reduced flow resistance of the final aqueous polymer dispersions of the invention, which normally have Newtonian flow characteristics. Below a solids volume concentration of 50% by volume the effect of the particle size distribution on the flow resistance decreases progressively. The final aqueous polymer dispersions of the invention are generally obtained as described in an industrially readily implementable manner with solids volume concentrations of up to 75% by volume with fully satisfactory reproducibility and no flocs.

The final aqueous polymer dispersions of the invention show their advantageous properties particularly markedly at solids volume concentrations above 65% by volume, which is why such final polymer dispersions are preferred. They are generally suitable for use as binders and as materials for preparing coatings and adhesive joints, for which purpose they may have additionally mixed into them in a conventional manner assistants such as film forming aids, fillers or plasticizers.

EXAMPLES

Example 1

Preparation of aqueous starting polymer dispersions II (SDII(1) to SDII(8)) of starting polymers II (SPII(1) to SPII(8))

SDII(1): A mixture of
1.44 kg of n-butyl acrylate,
16.28 kg of water,
1.27 kg of a 45% strength by weight solution of the surface active substance corresponding to Dowfax 2A1, and
0.52 kg of a 30% strength by weight aqueous hydrogen peroxide solution was admixed all at once with 25% by weight of stream II at 25° C. After the onset of the exothermic polymerization had heated the mixture to 50° C. (which took about 10 min), the remainder of stream II and the entire amount of the stream I were added continuously, starting at the same time, in the course of respectively 3 h and 2 h while the 50° C. were maintained. This was followed by an additional hour of stirring at 60° C.

Stream I:
47.0 kg of water,
14.7 kg of n-butyl acrylate,
14.7 kg of methyl methacrylate,
0.60 kg of methacrylic acid,
0.664 kg of a 45% strength by weight aqueous solution of the surface active substance corresponding to Dowfax 2A1

Stream II:
10 kg of water,
0.156 kg of ascorbic acid,
0.004 kg of iron(II) sulfate.

The result was an aqueous dispersion SDII(1), characterised as follows:

Solids content: 30% by weight
$d_{w,i}$: 40 nm $$\left( \frac{d_{90} - d_{10}}{d_{50}} \right)_1 : 0.549$$

SDII(2): A mixture of
521 g of water,
12 g of a 30% strength by weight aqueous hydrogen peroxide solution, and
600 g of aqueous dispersion SDII(1)

was heated to 60° C. and, while this temperature was maintained, continuously admixed, starting at the same time, with stream I (in the course of 2.5 h) and stream II (in the course of 3 h). This was followed by an additional hour of stirring at 60° C.

Stream I:
1176 g of n-butyl acrylate,
24 g of methacrylic acid,
30 g of a 20% strength by weight aqueous solution of an ethoxylated fatty alcohol ($C_{18}$, EO degree:18), and
60 g of a 45% strength by weight aqueous solution of the surface active substance corresponding to Dowfax 2A1
Stream II:
3.6 g of ascorbic acid,
0.12 g of iron(II) sulfate,
400 g of water.

The result was an aqueous dispersion SDII(2), characterised as follows:

Solids content: 40.8% by weight
$\bar{d}_{w,2}$: 84 nm $$\left( \frac{d_{90} - d_{10}}{d_{50}} \right)_2 : 0.288$$

SDII(3): As for SDII(2), except that the initial charge comprised
602 g of water,
12 g of a 30% strength by weight aqueous hydrogen peroxide solution, and
300 g of aqueous dispersion SDII(1).

The resulting aqueous dispersion SDII(3) had the following characteristics:

Solids content: 40.8% by weight
$\bar{d}_{w,3}$: 95 nm $$\left( \frac{d_{90} - d_{10}}{d_{50}} \right)_3 : 0.219$$

SDII(4): As for SDII(2), except that the initial charge comprised
639 g of water,
12 g of a 30% strength by weight aqueous hydrogen peroxide solution, and
160 g of aqueous dispersion SDII(1).

SDII(4) had the following characteristics:

Solids content: 40.3% by weight
$\bar{d}_{w,4}$: 122 nm $$\left( \frac{d_{90} - d_{10}}{d_{50}} \right)_4 : 0.201$$

SDII(5): As for SDII(2), except that the initial charge comprised
661 g of water,
12 g of a 30% strength by weight aqueous hydrogen peroxide solution, and
80 g of aqueous dispersion SDII(1).

SDII(5) had the following characteristics:

Solids content: 40.7% by weight
$\bar{d}_{w,5}$: 150 nm $$\left( \frac{d_{90} - d_{10}}{d_{50}} \right)_5 : 0.179$$

SDII(6): As for SDII(2), except that the initial charge comprised
672 g of water,
12 g of a 30% strength by weight aqueous hydrogen peroxide solution, and
40 g of aqueous dispersion SDII(1).

SDII(6) had the following characteristics:

Solids content: 40.8% by weight
$\bar{d}_{w,6}$: 198 nm $$\left( \frac{d_{90} - d_{10}}{d_{50}} \right)_6 : 0.167$$

SDII(7): As for SDII(2), except that the initial charge comprised
677 g of water,
12 g of a 30% strength by weight aqueous hydrogen peroxide solution, and
20 g of aqueous dispersion SDII(1).

SDII(7) had the following characteristics:

Solids content: 41.0% by weight
$\bar{d}_{w,7}$: 233 nm $$\left( \frac{d_{90} - d_{10}}{d_{50}} \right)_7 : 0.183$$

SDII(8): As for SDII(2), except that the initial charge comprised
680 g of water,
12 g of a 30% strength by weight aqueous hydrogen peroxide solution, and
10 g of aqueous dispersion SDII(1).

SDII(8) had the following characteristics:

Solids content: 40.7% by weight
$\bar{d}_{w,8}$: 283 nm $$\left( \frac{d_{90} - d_{10}}{d_{50}} \right)_8 : 0.145$$

Example 2

Preparation of aqueous starting polymer dispersions I (SDI(1) to SDI(9))

They were prepared by simply adding together those different dispersions SDII obtained in Example 1 in amounts determined in such a way that the resulting dispersions SDI contained the starting polymers SPII in the volume contents shown below in Table 1 (% by volume, based on the total volume of all the starting polymers SPII contained in the respective dispersion SDI). Accordingly, the solids content of the SDIs was in all cases about 40% by weight.

TABLE 1

| % by volume | SPII(1) | SPII(2) | SPII(3) | SPII(4) | SPII(5) | SPII(6) | SPII(7) | SPII(8) |
|---|---|---|---|---|---|---|---|---|
| SDI(1) | 0.7 | 3.1 | 3.9 | 6.5 | 10.0 | 17.1 | 23.7 | 35.0 |
| SDI(2) | 0.8 | — | — | — | — | — | 44.8 | 54.4 |
| SDI(3) | 0.6 | — | — | — | 22.4 | — | 34.8 | 42.2 |
| SDI(4) | — | 1.24 | — | — | 22.26 | — | 34.6 | 41.9 |
| SDI(5) | 0.81 | — | — | — | — | 22.4 | 30.96 | 45.73 |

TABLE 1-continued

| % by volume | SPII(1) | SPII(2) | SPII(3) | SPII(4) | SPII(5) | SPII(6) | SPII(7) | SPII(8) |
|---|---|---|---|---|---|---|---|---|
| SDI(6) | 2.0 | — | — | — | — | 22.2 | 30.6 | 45.2 |
| SDI(7) | 3.0 | — | — | — | — | 21.9 | 30.3 | 44.8 |
| SDI(8) | 1.9 | — | — | — | — | — | — | 98.1 |
| SDI(9) | 4.5 | — | — | — | — | 21.7 | 33.7 | 40.1 |

Example 3

Preparation of final aqueous polymer dispersions FD(1) to FD(13) according to the invention A mixture of water, of a 30% strength by weight aqueous hydrogen peroxide solution, of a starting polymer dispersion I of Example 2 and of part of stream I was heated to 70° C. and then admixed continuously, starting at the same time, with the remainder of stream I (in the course of 3 h) and stream II (the first 10% by weight within 20 min, the remaining 90% by weight within 220 min) while the polymerization temperature was maintained. This was followed by additional stirring for 1 h at 70° C.

The composition of stream I for FD(1) to FD(10) was as follows:
1960 g of n-butyl acrylate,
40 g of methacrylic acid,
100 g of a 20% strength by weight aqueous solution of the surface active substance corresponding to Dowfax 2A1,
50 g of a 20% strength by weight aqueous solution of an ethoxylated fatty alcohol ($C_{18}$, EO degree:18) and
W g of water, where W had been determined in such a way as to produce the Table 2 solids contents for the respective final aqueous polymer dispersion according to the invention.

The composition of stream I for FD(11) to FD(13) was similar, except that the 1960 g of n-butyl acrylate had been replaced by
FD(11):
1560 g of n-butyl acrylate and
400 g of methyl methacrylate FD(12):
1560 g of n-butyl acrylate and
400 g of methyl acrylate
FD(13):
1560 g of n-butyl acrylate
400 g of vinyl acetate.

The composition of stream II was in all cases:
300 g of water,
6 g of ascorbic acid, and
0.2 g of iron(II) sulfate.

Table 2 indicates the respective composition of the initial charge (quantities in grams), the solids content and the volume concentration of the final dispersion (% by weight and % by volume respectively) and also the dynamic viscosities $\eta_{60}$ and $\eta_{60.9}$ in mPa.s of final aqueous polymer dispersions diluted to a standard 60% by weight or 60.9% by volume respectively, the $\eta$ determinations having been carried out in accordance with DIN 53019 at 23° C. and at a shear gradient of 487 $s^{-1}$.

Table 3 additionally indicates the final polymer particle size distribution (% by weight of the particles of the final polymer whose particle diameter is $\leq$ X nm, where X is an element of the set {200, 300, 400, 500, 600, 700, 800, 900, 1000, 1200}).

TABLE 2

| | Final dispersions FD | | | | | | | | | | | | |
|---|---|---|---|---|---|---|---|---|---|---|---|---|---|
| | (1) | (2) | (3) | (4) | (5) | (6) | (7) | (8) | (9) | (10) | (11) | (12) | (13) |
| Water | 251 | 224 | 169 | 169 | 169 | 169 | 246 | 246 | 246 | 246 | 169 | 169 | 169 |
| Peroxide solution | 13.33 | 13.33 | 13.33 | 13.33 | 13.33 | 13.33 | 13.33 | 13.33 | 13.33 | 13.33 | 13.33 | 13.33 | 13.33 |
| SDI ( ) | 62.5 | 125 | 250 | 250 | 250 | 250 | 75 | 75 | 75 | 75 | 250 | 250 | 250 |
| | (1) | (1) | (1) | (2) | (3) | (4) | (5) | (6) | (7) | (8) | (9) | (9) | (9) |
| Proportion of stream I | 45.5 | 45.5 | 45.5 | 45.5 | 45.5 | — | 45.5 | 45.5 | 45.5 | 45.5 | 45.5 | 45.5 | 45.5 |
| Solids content | 68.0 | 67.1 | 65.8 | 68.0 | 66.6 | 66.8 | 70.6 | 67.8 | 67.5 | 70.3 | 65.9 | 67.1 | 64.7 |
| Volume concentration | 64.8 | 63.9 | 62.7 | 64.8 | 63.4 | 63.6 | 67.2 | 64.6 | 64.3 | 67.0 | 60.0 | 60.6 | 58.9 |
| $\eta_{60}$ | 21 | 44 | 56 | 29 | 43 | 45 | — | — | — | — | 50 | 37 | 33 |
| $\eta_{60.9}$ | 100 | 170 | 200 | 89 | 140 | 160 | 48 | 88 | 100 | 59 | — | — | — |

TABLE 3

| ED ( ) | 200 | 300 | 400 | 500 | 600 | 700 | 800 | 900 | 1000 | 1200 |
|---|---|---|---|---|---|---|---|---|---|---|
| (1) | 4 | 38 | 63 | 78 | 98 | 100 | — | — | — | — |
| (2) | 3 | 12 | 22 | 43 | 65 | 83 | 95 | 100 | — | — |

TABLE 3-continued

| ED ( ) | 200 | 300 | 400 | 500 | 600 | 700 | 800 | 900 | 1000 | 1200 |
|---|---|---|---|---|---|---|---|---|---|---|
| (3) | 4 | 15 | 47 | 74 | 92 | 100 | — | — | — | — |
| (4) | 4 | 11 | 18 | 21 | 22 | 72 | 98 | 100 | — | — |
| (5) | 3 | 11 | 33 | 48 | 97 | 100 | — | — | — | — |
| (6) | 4 | 11 | 46 | 74 | 98 | 100 | — | — | — | — |
| (7) | 2 | 14 | 24 | 35 | 36 | 50 | 78 | 98 | 98 | 100 |
| (8) | 4 | 8 | 40 | 43 | 46 | 68 | 86 | — | — | — |
| (9) | 4 | 10 | 44 | 46 | 50 | 78 | 95 | — | — | — |
| (10) | 4 | 8 | 30 | 50 | 52 | 54 | 56 | 100 | 100 | — |
| (11) | 24 | 47 | 75 | 82 | 100 | — | — | — | — | — |
| (12) | 12 | 42 | 64 | 74 | 95 | 100 | — | — | — | — |
| (13) | 20 | 40 | 61 | 75 | 98 | 100 | — | — | — | — |

We claim:

1. A process for preparing an aqueous polymer dispersion having a solids volume concentration of at least 50% by volume, which comprises polymerizing at least one radical polymerizable monomer other than a vinyl or vinylidene halide with the addition of at least one aqueous starting polymer dispersion I in a polymerization vessel by the method of free radical aqueous emulsion polymerization in the presence of dispersants and free radical polymerization initiators with the proviso that A) the mass of polymer contained in the at least one aqueous starting polymer dispersion I added relative to the total mass comprising the mass of the at least one radical polymerizable monomer and the mass of polymer added in the form of the aqueous starting polymer dispersion I is from 1 to 10%, B) the at least one aqueous starting polymer dispersion I added is constituted like an aqueous polymer dispersion obtained by adding together n aqueous starting polymer dispersions II with the proviso that a) n is an integer > 2, b) the weight average particle diameter of the starting polymer particles present in dispersion in the respective aqueous starting polymer dispersions II is for every aqueous starting polymer dispersion II within the range > 0 to 400 nm, c) the weight average particle diameter of the starting polymer particles of at least one aqueous starting polymer dispersion II is within the range > 0 to 100 nm, d) the aqueous starting polymer dispersions II have a monomodal distribution of the diameters of the starting polymer particles they contain such that, if $d_x$ defines the diameter below which is the particle diameter of X % by weight of all the starting polymer particles present in the particular aqueous starting dispersion II, the ratio $(d_{90}-d_{10})/d_{50}$ is from 0.1 to 0.6, e) the relation between the volume $V_i$, obtained by dividing the mass of the i-th starting polymer II present in the i-th aqueous starting polymer dispersion II by the mass density of the i-th starting polymer II, and the similarly determined volume $V_j$, providing that not only the weight average particle diameter ($\bar{d}_{w,i}$) of the starting polymer particles present in the i-th aqueous starting polymer dispersion II but also $\bar{d}_{w,j}$ is above 100 nm, satisfies equation 1

$$V_i = V_j \cdot k \cdot \left( \frac{\bar{d}_{w,i}}{\bar{d}_{w,j}} \right)^2$$

where k is from 1/1.5 to 1.5, f) the relation between the weight average particle diameter ($\bar{d}_{w,\leq 100}$) of the starting polymer particles determined over the total amount of all the aqueous starting polymer dispersions II that have a weight average particle diameter of the starting polymer particles they contain within the range >0 to ≦100 nm, and the weight average particle diameter $\bar{d}_{w,i}$ of the starting polymer particles present in the i-th aqueous starting polymer dispersion II, providing that $\bar{d}_{w,i}$ is > 100 nm, satisfies equation 2

$$V_i = V_{\leq 100} \cdot k' \cdot \left( \frac{\bar{d}_{w,i}}{\bar{d}_{w,\leq 100}} \right)^2$$

where k' is from 0.5 to 5, $V_i$ is the mass of the starting polymer present in the i-th aqueous starting polymer dispersion II divided by the mass density of the starting polymer, $V_{\leq 100}$ is the mass of the starting polymer present in the total amount of all aqueous starting polymer dispersions II that have a weight average particle diameter of the starting polymer particles they contain within the range >0 to ≦100 nm, divided by the mass density of the starting polymer, g) $V_{\leq 100}$ is from 0.3 to 10% by volume, based on the sum of all $V_i$, and h) the difference between the smallest and the largest weight average particle diameter $\bar{d}_{w,i}$ of the aqueous starting polymer dispersions II present in the aqueous starting polymer dispersion I is at least 150 nm, C) the total amount of the at least one aqueous starting polymer dispersion I to be added is introduced into the polymerization vessel as initial charge prior to the start of the free radical aqueous emulsion polymerization, and D) the free radical aqueous emulsion polymerization of the at least one radical polymerizable monomer is effected by the stream addition method with the proviso that from the start of the free radical aqueous emulsion polymerization the addition of the at least one radical polymerizable monomer to the polymerization vessel is effected in such a way that at any time of the addition the polymerization conversion of the total monomers already added previously to the polymerization vessel is at least 80 mol %, and the amount of dispersant present in the polymerization vessel is at any time from the start of the free radical aqueous emulsion polymerization from 0.5 to 5% by weight, based on the sum of the masses of starting polymer I and the monomers to be polymerized already added to the polymerization vessel.

2. A process for preparing an aqueous polymer dispersion having a solids volume concentration of at least 50% by volume, which comprises polymerizing at least one radical polymerizable monomer other than a vinyl or vinylidene halide with the addition of at least one aqueous starting polymer dispersion I in a polymerization vessel by the method of free radical aqueous emulsion polymerization in the presence of dispersants and free radical polymerization initiators with the proviso that A) the mass of polymer contained in the at least one aqueous starting polymer dispersion I added relative to the total mass comprising the mass of the at least one radical polymerizable monomer and the mass of polymer added in the form of the aqueous starting polymer dispersion I is from 1 to 10%, B) the at least one aqueous starting polymer dispersion I added is constituted like an aqueous polymer dispersion obtained by adding together n aqueous starting polymer dispersions II with the proviso that
  a) n=2,
  b) the weight average particle diameter of the starting polymer particles present in dispersion in the respective aqueous starting polymer dispersions II is for every aqueous starting polymer dispersion II within the range >0 to 400 nm,
  c) the weight average particle diameter of the starting polymer particles of at least one aqueous starting polymer dispersion II is within the range > 0 to 100 nm,
  d) the aqueous starting polymer dispersions II have a monomodal distribution of the diameters of the starting polymer particles they contain such that, if $d_x$ defines the diameter below which is the particle diameter of X % by weight of all the starting polymer particles present in the particular aqueous starting dispersion II, the ratio $(d_{90}-d_{10})/d_{50}$ is from 0.1 to 0.6,
  e) the relation between the volume $V_i$, obtained by dividing the mass of the i-th starting polymer II present in the i-th aqueous starting polymer dispersion II by the mass density of the i-th starting polymer II, and the similarly determined volume $V_j$, providing that not only the weight average particle diameter ($\bar{d}_{w,i}$) of the starting polymer particles present in the i-th aqueous starting polymer dispersion II but also $\bar{d}_{w,j}$ is above 100 nm, satisfies equation 1

$$V_i = V_j \cdot k \cdot \left( \frac{\bar{d}_{w,i}}{\bar{d}_{w,j}} \right)^2$$

where k is from 1/1.5 to 1.5,
  f) the relation between the weight average particle diameter ($\bar{d}_{w,\leq 100}$) of the starting polymer particles determined over the total amount of all the aqueous starting polymer dispersions II that have a weight average particle diameter of the starting polymer particles they contain within the range > 0 to $\leq$ 100 nm, and the weight average particle diameter $\bar{d}_{w,i}$ of the starting polymer particles present in the i-th aqueous starting polymer dispersion II, providing that $\bar{d}_{w,i}$ is > 100 nm, satisfies equation 2

$$V_i = V_{\leq 100} \cdot k' \left( \frac{\bar{d}_{w,i}}{\bar{d}_{w,\leq 100}} \right)^2$$

where k' is from 0.5 to 5, $V_i$ is the mass of the starting polymer present in the i-th aqueous starting polymer dispersion II divided by the mass density of the starting polymer, $V_{\leq 100}$ is the mass of the starting polymer present in the total amount of all aqueous starting polymer dispersions II that have a weight average particle diameter of the starting polymer particles they contain within the range >0 to $\leq$100 nm, divided by the mass density of the starting polymer,
  g) $V_{\leq 100}$ is from 0.3 to 10% by volume, based on the sum of all $V_i$, and
  h) the difference between the smallest and the largest weight average particle diameter $\bar{d}_{w,i}$ of the aqueous starting polymer dispersions II present in the aqueous starting polymer dispersion I is at least 150 nm, C) the total amount of the at least one aqueous starting polymer dispersion I to be added is introduced into the polymerization vessel as initial charge prior to the start of the free radical aqueous emulsion polymerization, and D) the free radical aqueous emulsion polymerization of the at least one radical polymerizable monomer is effected by the stream addition method with the proviso that
  from the start of the free radical aqueous emulsion polymerization the addition of the at least one radical polymerizable monomer to the polymerization vessel is effected in such a way that at any time of the addition the polymerization conversion of the total monomers already added previously to the polymerization vessel is at least 80 mol %, and
  the amount of dispersant present in the polymerization vessel is at any time from the start of the free radical aqueous emulsion polymerization from 0.5 to 5% by weight, based on the sum of the masses of starting polymer I and the monomers to be polymerized already added to the polymerization vessel.

3. The process as claimed in claim 1, wherein the at least one aqueous starting polymer dispersion I used contains of aqueous starting polymer dispersions II where $\bar{d}_{w,i} \leq$ 100 nm only those whose $\bar{d}_{w,i}$ is exclusively within the range $\geq$ 20 nm to $\leq$100 nm.

4. The process as claimed in claim 1, wherein the at least one aqueous starting polymer dispersion I used contains only such aqueous starting polymer dispersions II that the difference between $\bar{d}_{w,\leq 100}$ and $\bar{d}_{w,i}$, where $\bar{d}_{w,i}$ here is the weight average particle diameter of that aqueous starting polymer dispersion II contained in the aqueous starting polymer dispersion I whose above 100 nm value is closest to 100 nm, is at least 60 nm.

5. The process as claimed in claim 1, wherein the at least one aqueous starting dispersion I used has k values within the range from 0.9 to 1.1 and k' values within the range from 0.75 to 3.

6. The process as claimed in claim 1, wherein the at least one aqueous starting polymer dispersign I used has a $V_{\leq 100}$ from 0.5 to 5% by volume, based on the sum of all the $V_i$ contained.

7. The process as claimed in claim 2, wherein the at least one aqueous starting polymer dispersion I used contains of aqueous starting polymer dispersions II where $\bar{d}_{w,i} \leq$ 100 nm only those whose $\bar{d}_{w,i}$ is exclusively within the range $\geq$ 20 nm to $\leq$100 nm.

8. The process as claimed in claim 2, wherein the at least one aqueous starting polymer dispersion I used contains only such aqueous starting polymer dispersions II that the difference between $\bar{d}_{w\leq100}$ and $\bar{d}_{w,i}$, where $\bar{d}_{w,i}$ here is the weight average particle diameter of that aqueous starting polymer dispersion II contained in the aqueous starting polymer dispersion I whose above 100 nm value is closest to 100 nm, is at least 60 nm.

9. The process as claimed in claim 2, wherein the at least one aqueous starting dispersion I used has k values within the range from 0.9 to 1.1 and k' values within the range from 0.75 to 3.

10. The process as claimed in claim 2, wherein the at least one aqueous starting polymer dispersion I used has a $V_{\leq100}$ from 0.5 to 5% by volume, based on the sum of all the $V_i$ contained.

11. The process as claimed in claim 1, wherein said aqueous polymer dispersion has a solids volume concentration of $\geq65\%$ by volume.

12. The process as claimed in claim 1, wherein said aqueous polymer dispersion comprises a polymer comprising
from 70 to 100% by weight of a $C_{1-12}$ alkanol ester of acrylic acid, a $C_{1-12}$ alkanol ester of methacrylic acid, styrene or a mixture thereof.

13. The process as claimed in claim 2, wherein said aqueous polymer dispersion has a solids volume concentration of $\geq65\%$ by volume.

14. The process as claimed in claim 2, wherein said aqueous polymer dispersion comprises a polymer comprising
from 70 to 100% by weight of a $C_{1-12}$ alkanol ester of acrylic acid, a $C_{1-12}$ alkanol ester of methacrylic acid, styrene or a mixture thereof.

15. The process as claimed in claim 1, wherein said aqueous polymer dispersion comprises a polymer comprising:
from 70–99% by weight of a $C_{1-8}$ alkanol ester of acrylic acid, a $C_{1-8}$ alkanol ester of methacrylic acid or a mixture thereof,
from 1–5% by weight of acrylic acid, methacrylic acid or a mixture thereof, and
from 0–25% by weight of vinyl acetate, styrene or a mixture thereof.

16. The process as claimed in claim 2, wherein said aqueous polymer dispersion comprises a polymer comprising:
from 70–99% by weight of a $C_{1-8}$ alkanol ester of acrylic acid, a $C_{1-8}$ alkanol ester of methacrylic acid or a mixture thereof,
from 1–5% by weight of acrylic acid, methacrylic acid or a mixture thereof, and
from 0–25% by weight of vinyl acetate, styrene or a mixture thereof.

17. The process as claimed in claim 1, wherein said aqueous polymer dispersion comprises a polymer comprising
from 70 to 100% by weight of butadiene or a mixture of butadiene and styrene.

18. The process as claimed in claim 2, wherein said aqueous polymer dispersion comprises a polymer comprising
from 70 to 100% by weight of butadiene or a mixture of butadiene and styrene.

19. The process as claimed in claim 1, wherein the at least one aqueous starting polymer dispersion I used contains of aqueous starting polymer dispersions II where $\bar{d}_{w,i} \leq 100$ nm only those whose $\bar{d}_{w,i}$ is exclusively within the range $\geq30$ nm to $\leq60$ nm.

20. The process as claimed in claim 2, wherein the at least one aqueous starting polymer dispersion I used contains of aqueous starting polymer dispersions II where $\bar{d}_{w,i} \leq 100$ nm only those whose $\bar{d}_{w,i}$ is exclusively within the range $\geq30$ nm to $\leq60$ nm.

21. The process as claimed in claim 1, wherein the at least one aqueous starting polymer dispersion I used contains only such aqueous starting polymer dispersions II that the difference between $\bar{d}_{w\leq100}$ and and $\bar{d}_{w,i}$, where $\bar{d}_{w,i}$ here is the weight average particle diameter of that aqueous starting polymer dispersion II contained in the aqueous starting polymer dispersion I whose above 100 nm value is closest to 100 nm, is at least 100 nm.

22. The process as claimed in claim 2, wherein the at least one aqueous starting polymer dispersion I used contains only such aqueous starting polymer dispersions II that the difference between $\bar{d}_{w\leq100}$ and $\bar{d}_{w,i}$ where $\bar{d}_{w,i}$ here is the weight average particle diameter of that aqueous starting polymer dispersion II contained in the aqueous starting polymer dispersion I whose above 100 nm value is closest to 100 nm, is at least 100 nm.

23. The process according to claim 1, wherein k is from 0.9 to 1.1.

24. The process according to claim 2, wherein k is from 0.9 to 1.1.

25. The process according to claim 1, wherein k' is from 0.75 to 3.

26. The process according to claim 2, wherein k' is from 0.75 to 3.

27. The process according to claim 1, wherein $V_{\leq100}$ is from 0.5 to 5% by volume.

28. The process according to claim 1, wherein $V_{\leq100}$ is from 0.5 to 5% by volume.

* * * * *